(12) United States Patent
Hangartner

(10) Patent No.: US 7,877,387 B2
(45) Date of Patent: Jan. 25, 2011

(54) SYSTEMS AND METHODS FOR PROMOTIONAL MEDIA ITEM SELECTION AND PROMOTIONAL PROGRAM UNIT GENERATION

(75) Inventor: Rick Hangartner, Corvallis, OR (US)

(73) Assignee: Strands, Inc., Corvallis, OR (US)

( * ) Notice: Subject to any disclaimer, the term of this patent is extended or adjusted under 35 U.S.C. 154(b) by 345 days.

(21) Appl. No.: 11/541,915

(22) Filed: Oct. 2, 2006

(65) Prior Publication Data

US 2007/0078836 A1 Apr. 5, 2007

Related U.S. Application Data

(60) Provisional application No. 60/722,750, filed on Sep. 30, 2005, provisional application No. 60/730,599, filed on Oct. 26, 2005.

(51) Int. Cl.
*G06F 7/00* (2006.01)
*G06F 17/30* (2006.01)
*G06F 21/00* (2006.01)

(52) U.S. Cl. .................. 707/736; 707/713; 705/59
(58) Field of Classification Search ................. None
See application file for complete search history.

(56) References Cited

U.S. PATENT DOCUMENTS

| | | | |
|---|---|---|---|
| 5,355,302 A | 10/1994 | Martin | |
| 5,375,235 A | 12/1994 | Berry | |
| 5,464,946 A | 11/1995 | Lewis | |
| 5,483,278 A | 1/1996 | Strubbe | |
| 5,583,763 A | 12/1996 | Atcheson | |
| 5,724,521 A | 3/1998 | Dedrick | |
| 5,754,939 A | 5/1998 | Herz | |
| 5,758,257 A | 5/1998 | Herz | |
| 5,890,152 A | 3/1999 | Rapaport | |
| 5,918,014 A | 6/1999 | Robinson | ..................... 395/200 |
| 5,950,176 A | 9/1999 | Keiser | |
| 6,000,044 A | 12/1999 | Chrysos | |
| 6,047,311 A | 4/2000 | Ueno | |
| 6,112,186 A | 8/2000 | Bergh | |
| 6,134,532 A | 10/2000 | Lazarus et al. | ................ 705/14 |

(Continued)

FOREIGN PATENT DOCUMENTS

EP 1 050 833 8/2000

(Continued)

OTHER PUBLICATIONS

International Bureau; PCT Search Report and Written Opinion; Mar. 20, 2008; 10 pages.

(Continued)

*Primary Examiner*—Neveen Abel-Jalil
*Assistant Examiner*—Raheem Hoffler
(74) *Attorney, Agent, or Firm*—Stolowitz Ford Cowger LLP

(57) ABSTRACT

Disclosed are embodiments of systems and methods for selection of promotional media items and/or generation of promotional or advertising units. In one embodiment, a set of promotional media items may be dynamically identified responsive to an input set of media items. In another embodiment, a promotional program unit is generated in response to receipt of user taste data for a user or group of users. The promotional program unit is an integral unit made up of one or more media items and one or more promotional media items.

12 Claims, 5 Drawing Sheets

U.S. PATENT DOCUMENTS

| | | | |
|---|---|---|---|
| 6,345,288 B1 | 2/2002 | Reed | |
| 6,346,951 B1 | 2/2002 | Mastronardi | |
| 6,347,313 B1 | 2/2002 | Ma | |
| 6,349,339 B1 | 2/2002 | Williams | |
| 6,381,575 B1 | 4/2002 | Martin | |
| 6,430,539 B1 | 8/2002 | Lazarus et al. | 705/10 |
| 6,434,621 B1 | 8/2002 | Pezzillo | |
| 6,438,579 B1 | 8/2002 | Hosken | 709/203 |
| 6,487,539 B1 | 11/2002 | Aggarwal et al. | 705/14 |
| 6,526,411 B1 | 2/2003 | Ward | |
| 6,532,469 B1 | 3/2003 | Feldman | |
| 6,577,716 B1 | 6/2003 | Minter | |
| 6,587,127 B1 * | 7/2003 | Leeke et al. | 715/765 |
| 6,596,405 B2 | 7/2003 | Dunning | |
| 6,615,208 B1 | 9/2003 | Behrens et al. | 707/5 |
| 6,647,371 B2 | 11/2003 | Shinohara | |
| 6,687,696 B2 | 2/2004 | Hofmann | |
| 6,690,918 B2 | 2/2004 | Evans | |
| 6,704,576 B1 | 3/2004 | Brachman | |
| 6,748,395 B1 | 6/2004 | Picker | |
| 6,751,574 B2 | 6/2004 | Shinohara | |
| 6,785,688 B2 | 8/2004 | Abajuan | |
| 6,842,761 B2 | 1/2005 | Diamond | |
| 6,850,252 B1 | 2/2005 | Hoffberg | |
| 6,914,891 B2 | 7/2005 | Ha | |
| 6,931,454 B2 | 8/2005 | Deshpande | |
| 6,941,324 B2 | 9/2005 | Plastina | |
| 6,947,922 B1 | 9/2005 | Glance | |
| 6,950,804 B2 * | 9/2005 | Strietzel | 705/26 |
| 6,987,221 B2 | 1/2006 | Platt | |
| 6,990,497 B2 | 1/2006 | O'Rourke | |
| 6,993,532 B1 | 1/2006 | Platt | |
| 7,020,637 B2 | 3/2006 | Bratton | |
| 7,021,836 B2 | 4/2006 | Bratton | |
| 7,051,352 B1 * | 5/2006 | Schaffer | 725/39 |
| 7,072,846 B1 | 7/2006 | Robinson | |
| 7,082,407 B1 | 7/2006 | Bezos | |
| 7,096,234 B2 | 8/2006 | Plastina | |
| 7,111,240 B2 | 9/2006 | Crow | |
| 7,113,917 B2 | 9/2006 | Jacobi | |
| 7,113,999 B2 | 9/2006 | Pestoni | |
| 7,120,619 B2 | 10/2006 | Drucker | |
| 7,127,143 B2 | 10/2006 | Elkins | |
| 7,136,866 B2 | 11/2006 | Springer, Jr. | |
| 7,139,723 B2 | 11/2006 | Conkwright | |
| 7,174,126 B2 | 2/2007 | McElhatten | |
| 7,180,473 B2 | 2/2007 | Horie | |
| 7,194,421 B2 | 3/2007 | Conkwright | |
| 7,197,472 B2 | 3/2007 | Conkwright | |
| 7,224,282 B2 | 5/2007 | Terauchi | |
| 7,236,941 B2 | 6/2007 | Conkwright | |
| 7,256,341 B2 | 8/2007 | Plastina | |
| 7,277,870 B2 | 10/2007 | Mourad | |
| 7,302,419 B2 | 11/2007 | Conkwright | |
| 7,302,468 B2 | 11/2007 | Wijeratne | |
| 7,358,434 B2 | 4/2008 | Plastina | |
| 7,363,314 B2 | 4/2008 | Picker | |
| 7,392,212 B2 | 6/2008 | Hancock | |
| 7,403,769 B2 | 7/2008 | Kopra | |
| 7,415,181 B2 | 8/2008 | Greenwood | |
| 7,457,862 B2 | 11/2008 | Hepworth | |
| 7,478,323 B2 | 1/2009 | Dowdy | |
| 7,493,572 B2 | 2/2009 | Card | |
| 7,499,630 B2 | 3/2009 | Koch | |
| 7,505,959 B2 | 3/2009 | Kaiser | |
| 7,546,254 B2 | 6/2009 | Bednarek | |
| 7,568,213 B2 | 7/2009 | Carhart | |
| 7,574,422 B2 | 8/2009 | Guan | |
| 7,580,932 B2 | 8/2009 | Plastina | |
| 7,599,950 B2 | 10/2009 | Walther | |
| 7,644,077 B2 | 1/2010 | Picker | |
| 7,657,224 B2 | 2/2010 | Goldberg | |
| 7,734,569 B2 | 6/2010 | Martin | |
| 2001/0056434 A1 | 12/2001 | Kaplan | |
| 2002/0002899 A1 | 1/2002 | Gjerdingen | |
| 2002/0059094 A1 * | 5/2002 | Hosea et al. | 705/10 |
| 2002/0082901 A1 | 6/2002 | Dunning et al. | 705/10 |
| 2002/0152117 A1 * | 10/2002 | Cristofalo et al. | 705/14 |
| 2002/0178223 A1 | 11/2002 | Bushkin | |
| 2002/0194215 A1 * | 12/2002 | Cantrell et al. | 707/500 |
| 2003/0018797 A1 | 1/2003 | Dunning et al. | 709/231 |
| 2003/0033321 A1 | 2/2003 | Schrempp | |
| 2003/0055689 A1 | 3/2003 | Block | |
| 2003/0097379 A1 | 5/2003 | Ireton | |
| 2003/0120630 A1 | 6/2003 | Tunkelang | |
| 2003/0212710 A1 * | 11/2003 | Guy | 707/104.1 |
| 2003/0229537 A1 * | 12/2003 | Dunning et al. | 705/10 |
| 2004/0002993 A1 | 1/2004 | Toussaint | |
| 2004/0003392 A1 | 1/2004 | Trajkovic | |
| 2004/0068552 A1 | 4/2004 | Kotz | |
| 2004/0073924 A1 | 4/2004 | Pendakur | |
| 2004/0128286 A1 | 7/2004 | Yasushita | |
| 2004/0139064 A1 | 7/2004 | Chevallier | |
| 2004/0148424 A1 | 7/2004 | Berkson | |
| 2004/0158860 A1 | 8/2004 | Crow | |
| 2004/0267715 A1 | 12/2004 | Polson | |
| 2005/0021470 A1 | 1/2005 | Martin | |
| 2005/0060350 A1 | 3/2005 | Baum | |
| 2005/0075908 A1 | 4/2005 | Stevens | |
| 2005/0091146 A1 | 4/2005 | Levinson | |
| 2005/0102610 A1 | 5/2005 | Jie | |
| 2005/0114357 A1 | 5/2005 | Chengalvarayan | |
| 2005/0141709 A1 | 6/2005 | Bratton | |
| 2005/0154608 A1 | 7/2005 | Paulson | |
| 2005/0193014 A1 | 9/2005 | Prince | |
| 2005/0193054 A1 | 9/2005 | Wilson | |
| 2005/0195696 A1 | 9/2005 | Rekimoto | |
| 2005/0203807 A1 | 9/2005 | Bezos et al. | |
| 2005/0210101 A1 | 9/2005 | Janik | |
| 2005/0222989 A1 | 10/2005 | Haveliwala | |
| 2005/0223039 A1 | 10/2005 | Kim | |
| 2005/0234891 A1 | 10/2005 | Walther | |
| 2005/0235811 A1 | 10/2005 | Dukane | |
| 2005/0256867 A1 | 11/2005 | Walther | |
| 2005/0276573 A1 | 12/2005 | Reed | |
| 2006/0015904 A1 * | 1/2006 | Marcus | 725/46 |
| 2006/0018208 A1 | 1/2006 | Nathan | |
| 2006/0018209 A1 | 1/2006 | Drakoulis | |
| 2006/0020062 A1 | 1/2006 | Bloom | |
| 2006/0026263 A1 | 2/2006 | Raghavan | |
| 2006/0062094 A1 | 3/2006 | Nathan | |
| 2006/0067296 A1 | 3/2006 | Bershad | |
| 2006/0074750 A1 | 4/2006 | Clark | |
| 2006/0080356 A1 | 4/2006 | Burges | |
| 2006/0091203 A1 | 5/2006 | Bakker | |
| 2006/0095516 A1 * | 5/2006 | Wijeratne | 709/205 |
| 2006/0100978 A1 | 5/2006 | Heller | |
| 2006/0112098 A1 | 5/2006 | Renshaw | |
| 2006/0123052 A1 | 6/2006 | Robbin | |
| 2006/0136344 A1 | 6/2006 | Jones | |
| 2006/0165571 A1 | 7/2006 | Seon | |
| 2006/0168616 A1 | 7/2006 | Candelore | |
| 2006/0173910 A1 | 8/2006 | McLaughlin | |
| 2006/0173916 A1 | 8/2006 | Verbeck | |
| 2006/0195462 A1 | 8/2006 | Rogers | |
| 2006/0195513 A1 | 8/2006 | Rogers | |
| 2006/0195514 A1 | 8/2006 | Rogers | |
| 2006/0195515 A1 | 8/2006 | Beaupre | |
| 2006/0195516 A1 | 8/2006 | Beaupre | |
| 2006/0195521 A1 | 8/2006 | New | |
| 2006/0195789 A1 | 8/2006 | Rogers | |
| 2006/0195790 A1 | 8/2006 | Beaupre | |
| 2006/0253874 A1 | 11/2006 | Stark | |
| 2006/0277098 A1 * | 12/2006 | Chung et al. | 705/14 |

| | | | |
|---|---|---|---|
| 2006/0282311 A1* | 12/2006 | Jiang | 705/14 |
| 2006/0288044 A1 | 12/2006 | Kashiwagi | |
| 2006/0288367 A1* | 12/2006 | Swix et al. | 725/46 |
| 2007/0016507 A1 | 1/2007 | Tzara | |
| 2007/0043829 A1 | 2/2007 | Dua | |
| 2007/0100690 A1* | 5/2007 | Hopkins | 705/14 |
| 2007/0118546 A1 | 5/2007 | Acharya | |
| 2007/0136264 A1 | 6/2007 | Tran | |
| 2007/0156677 A1 | 7/2007 | Szabo | |
| 2007/0161402 A1 | 7/2007 | Ng | |
| 2007/0203790 A1 | 8/2007 | Torrens | |
| 2007/0244880 A1 | 10/2007 | Martin | |
| 2007/0250429 A1 | 10/2007 | Walser | |
| 2007/0250761 A1 | 10/2007 | Bradley | |
| 2007/0271286 A1 | 11/2007 | Purang | |
| 2007/0294096 A1 | 12/2007 | Randall | |
| 2008/0004948 A1 | 1/2008 | Flake | |
| 2008/0004990 A1 | 1/2008 | Flake | |
| 2008/0027881 A1 | 1/2008 | Bisse | |
| 2008/0046317 A1 | 2/2008 | Christianson | |
| 2008/0077264 A1 | 3/2008 | Irvin | |
| 2008/0082467 A1 | 4/2008 | Meijer | |
| 2008/0133601 A1 | 6/2008 | Cervera | |
| 2008/0155057 A1 | 6/2008 | Khedouri | |
| 2008/0155588 A1* | 6/2008 | Roberts et al. | 725/34 |
| 2008/0220855 A1 | 9/2008 | Chen | |
| 2008/0270221 A1 | 10/2008 | Clemens | |
| 2009/0024504 A1 | 1/2009 | Lerman | |
| 2009/0024510 A1 | 1/2009 | Chen | |
| 2009/0073174 A1 | 3/2009 | Berg | |
| 2009/0076939 A1 | 3/2009 | Berg | |
| 2009/0076974 A1 | 3/2009 | Berg | |
| 2009/0083307 A1 | 3/2009 | Cervera | |
| 2009/0089222 A1 | 4/2009 | Ferreira | |
| 2009/0106085 A1 | 4/2009 | Raimbeault | |
| 2009/0210415 A1 | 8/2009 | Martin | |
| 2009/0276368 A1 | 11/2009 | Martin | |
| 2010/0169328 A1 | 7/2010 | Hangartner | |

FOREIGN PATENT DOCUMENTS

| | | |
|---|---|---|
| EP | 1 231 788 A1 | 8/2002 |
| EP | 1 420 388 | 5/2004 |
| EP | 1 548 741 A1 | 6/2005 |
| JP | 11-052965 | 2/1999 |
| JP | 2002-108351 | 4/2002 |
| JP | 2003-255958 | 10/2003 |
| KR | 2002-025579 | 4/2002 |
| WO | WO 03036541 A1 | 5/2003 |
| WO | WO03051051 A1 | 6/2003 |
| WO | WO 2004/070538 A2 | 8/2004 |
| WO | WO2004070538 | 8/2004 |
| WO | WO2005013114 A1 | 2/2005 |
| WO | WO 2005115107 A2 | 12/2005 |
| WO | WO 2006/052837 | 5/2006 |
| WO | WO2006075032 | 7/2006 |
| WO | WO2006114451 | 11/2006 |
| WO | WO 2007/134193 A3 | 5/2007 |
| WO | WO 2007/075622 A2 | 7/2007 |
| WO | WO 2007/092053 A1 | 8/2007 |
| WO | WO2009149046 A1 | 12/2009 |

OTHER PUBLICATIONS

Logan, Beth, Content-Based Playlist Generation: Exploratory Experiments, The International Conference on Music Information Retrieval and Related Activities (ISMIR 2002), Paris, France, Oct. 2002, 2 pages.

Maidin, Donncha O. et al., The Best of Two Worlds: Retrieving and Browsing, Proceedings of the COST G-6 Conference on Digital Audio Effects (DAFX-00), Verona, Italy, Dec. 7-9, 2000, 4 pages.

New Music Recommendation System is Based on FOAF Personal Profiling, www.maternewmedia.org/news/2006/04/13/social_networking_meets_music_listening.html, Apr. 13, 2006.

Notess, Mark et al., Variations2: Toward Visual Interface for Digital Music Libraries, Second International Workshop on Visual Interfaces to Digital Libraries, 2002, 6 pages.

Pauws, Steffen et al., "PATS: Realization and User Evaluation of an Automatic Playlist Generator," The International Conferences on Music Information Retrieval and Related Activities (ISMIR 2002), Paris, France, Oct. 2002, 9 pages.

Platt, John C. et al., "Learning a Gaussian Process Prior for Automatically Generating Music Playlists," Microsoft Corporation {plait, cburgess, sswenson, chriswea}@microsoft.com, alcez@cs.berkeley.edu, (pp. 1-9).

Platt, John S., "Fast Embedding of Sparse Music Similarity Graphs," Microsoft Corporation, {jplatt@microsoft.com}.

Rauber, Andreas et al., The SOM-enhanced JukeBox: Organization and Visualization of Music Collections Based on Perceptual Models, Journal of New Music Research, vol. 32, Nov. 2, 2003, pp. 193-210.

Scihira, I. "A Characterization of Singular Graphs." Electronic Journal of Linear Algebra, 16:451-462, 2007.

Shneiderman, Ben, Tree Visualization with Tree-Maps: 2-d Space-Filing Approach, ACM Transactionso n Graphics, vol. 11, No. 1, Jan. 1992, pp. 92-99.

Shneiderman, Ben, Treemaps for Space-Constrained Visualization of Hierarchies, http://www.sc.umd.edu/heil/treemap-history/, last updated Apr. 28, 2006, 16 pages.

Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%Fs1112%2F08s12%2F08s12.asp.

PCT/US06/38769; International Search Authority; Mar. 25, 2008; 3 Pages.

PCT/US06/48330; International Bureau; PCT Search Report and Written Opinion; Mar. 20, 2008; 10 pages.

PCT/US07/68708; International Search Report; May 10, 2007.

PCT/US2006/003795; International Search Report and Written Opinion of International Application, dated May 28, 2008.

PCT/US2006/034218; USPTO Search Authority; PCT International Search Report; Feb. 9, 2007.

Treemap, University of Maryland, http://www.cs.umd.edu/hcil/treemap/, last updated Aug. 5, 2003, 4 pages.

Trustees of Indiana University, Variations2, The Indiana University Digital Music Library, http://dmi.indiana.edu/, last updated May 11, 2005.

Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages.

Web Page, www.akoo.com/Akoo/, AKOO, Pick the Music, Waiting in the line at the Theme Park, Introducing the m-Venue™ platform, (Sep. 7, 2006).

Web Page, www.alwayson-network.com/ comments.php?id=P12663 0 37 0 C, Not Your Average Jukebox, On Hollywood 100 contender Ecast uses broadband to bring the digital media experience to your watering hole (Sep. 7, 2006).

Web Page, www.axcessnews.com/modules/wfsection/article.php?articleid=8327, Feb. 24, 2006, Maintenance Fees, Digital Music Sales Triple to $1.1 Billion in 2005, (Sep. 7, 2006).

Web Page, www.bmi.com/news/200403/20040324b.asp, BMI™ Figures Don'T Lie, Mar. 24, 2004, Touch Tunes Signs License Agreement for BMI Music in Digital Jukeboxes (Sep. 7, 2006).

Web Page, www.ecastinc.com/music_licensing.html, ECAST Network, interactive entertainment network, Music/ Licensing (Sep. 7, 2006).

Web Page, www.rfidjournal.com/article/ articleview/1619/1/1, RFID brings messages to Seattle side walks, an RFID system being deployed next week will send marketing and assistive information to users carrying active RFID tags. RFID Journal (pp. 1-4) (Jul. 3, 2006).

Web Page, www.roweinternational.com/jukeboxes_dia.html, Digital Internet Access Jukeboxes, Rowe International (Sep. 7, 2006).

Web Page, www.touchtunes.com, Touchtunes, Turn your ROWE 100A's and 100B's into touch tunes Digital Jukeboxes—BOSE (Sep. 7, 2006).

"New Music Recommendation System is Based on FOAF Personal Profiling," www.maternewmedia.org/news/2006/04/13/social_networking_meets_music_listening.html, Oct. 1, 2005.

"Social Networking Meets Music Listening: Mecora Launches Radio 2.0," www.maternewmedia.org/news/2006/04/13/social_networking_meets_music_listening.htm, Apr. 13, 2006.

Baluja, S.; Seth, R.; Sivakumar, D.; Ying, Y.; Yagnik, J.; Kumar, S.; Ravichandra, D.; and Aly, M.; "Video Suggestion and Discovery for YouTube: Taking Random Walks Through the View Graph." In WWW '08: Proceedings fo the 17th international conference on World Wide Web, pp. 895-904, Bejing, China, 2008. ACM Press.

Cano, Pedro et al., On the Use of FastMap for Audio Retrieval and Browsing, The International Conference on Music Information Retrieval and Related Activities (ISMIR 2002), Paris, France, Oct. 2002, 2 pages.

Connell, Lain et al., Ontological Sketch Models: Highlighting User-System Misfits, In P. Palanque, E. O'Neill and P. Johnson, editors, Proceedings of Human Computer Interaction (HCI) Bath, England, Sep. 2003, London Springer, pp. 1-16.

Das, A.; Datar, M.; Garg, A.; and Rajaram, S. "Google News Personalization: Sociable Online Collaborative Filtering." In WWW '07: Proceedings of the 16th international conference on World Wide Web, pp. 271-280, New York, NY, USA, 2007. ACM Press.

Dean, J. and Ghemawat, S., "MapReduce: Simplied Data Processing on Large Clusters." Commun. ACM, 51 (1):107-113, 2008.

Dempster, Y.; Laird, N.; and Rubin, D. "Maximum Likelihood from Incomplete Data via the EM Algorithm." Journal of the Royal Stat. Soc., Ser. B., 39:1047-1053, 1977.

Deshpande, Mukund et al., Item-Based Top-N Recommendation Algorithms, ACM Transactions on Information Systems, 22:1 (Jan. 2004) pp. 143-177.

François Pachet, "A Taxonomy of Musical Genres," Content-Based Multimedia Information Access Conference (RIAO), Paris, Apr. 2000, 8 Pages.

Hofmann, T. "Latent Semantic Models for Collaborative Filtering." ACM Transactions on Information Systems, 22:89-115, 2004.

Hofmann, T. "Unsupervised Learning by Probabilistic Latent Semantic Analysis." Mach. Learn., 42:177-196. 2001.

Indyk, P. and Matousek, J. "Low-Distortion Embeddings of Finite Metric Spaces." In Handbook of Discrete and Computational Geometry, pp. 177-196. CRC Press, 2004.

Jose Alvear, Jun. 30, 2000, www.streamingmedia.com/article.ap?id=5768, Streaming media.com, "Risk-Free Trial Streaming Media Delivery Tools".

Lazar, N.A.; Bayesian Empirical Likelihood; Technical Report, Carnegi Mellon University, Department of Statistics, 2002; 26 pages.

Logan, Beth et al., A Music Similarity Function Based on Signal Analysis, IEEE International Conference on Multimedia and Expo (ICME), Tokyo, Japan, Aug. 2001, IEEE Press, pp. 952-955.

Augmenting the Social Space of an Academic Conference; McCarthy, et al. Information School, University of Washington and Department of Computer Science and Engineering, University of Minnesota; pp. 1-10; Nov. 6-10, 2004.

Carlson et al. "Internet Banking Market Developments and Regulatory Issues in the New Economy: what Changed, and the Challenges for Economic Policy . . . "; May 2001; http://www.occ.gov/netbank/SGEC2000.pdf.

Co-Construction of Hybrid Spaces; Asa Rudstrom; A Dissertation submitted to the University of Stockholm in partial fulfillment of the requirements for the Degree of Doctor of Philosophy; Department of Computer and Systems Sciences Stockholm University and Royal Institute of Technology; pp. 1-69; Nov. 2005.

Industry Standard, The, Help FAQs for Standard Prediction Market, http://www.thestandard.com/help, downloaded Jun. 29, 2009.

International Search Report PCT/US2009/051233; Sep. 4, 2009; Strands, Inc.

IP City, Integrated Project on Interaction and Presence on Urban Environments-Demonstrators on Large-Scale Events Applications; ipcity.eu; Giulio Jacucci, John Evans, Tommi Ilmonen; pp. 1-37; Feb. 9, 2007.

MobiLenin— Combining a Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005.

Pampalk, Elias et al., Content-based Organization and Visualization of Music Archives, ACM Multimedia, Juan les Pins, France, Dec. 2002, pp. 570-579.

PCT/US07/068708; Filed May 10, 2007; International Search Report and Written Opinion; WO 2007/134193; Dec. 7, 2007.

PCT/US09/42002; Filed Apr. 28, 2009; International Search Report and Written Opinion; Jun. 2009.

PCT/US09/45911; Filed Jun. 2, 2009; International Search Report and Written Opinion.

Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%Fs1112%2F08s12.asp.

The Trustees of Indiana University, Variations2, The Indiana University Digital Music Library, http://dml.indiana.edu/, last updated May 11, 2005, 1 page.

Toward University Mobile Interaction for Shared Displays; Tim Paek, et al.; Microsoft Research, Redmond, WA; pp. 1-4; Nov. 6-10, 2004.

Wolfers, Justin and Zitzewitz, Eric, Prediction Markets, Journal of Economic Perspectives, Spring 2004, pp. 107-126, vol. 18, No. 2.

Yen, Yi-Wyn, Apple announces a 32GB iPhone 3G by Jun. 15, 2009, The Industry Standard, Apr. 2, 2009, http://www.thestandard.com/preditions/channel/hardware, downloaded Apr. 8, 2009.

PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218.

Toward alernative metrics of journal impact: a comparison of download and citation data, Johan Bollen, Herbert Van de Sompel, Joan Smith, Rick Luce, Google.com, 2005, pp. 1-2.

Apple: iTunes 4.2 User Guide for Windows; Dec. 2003; retrieved from the internet: URL: http://www2.austin.cc.tx.us/tcm/projects/itunes.pdf; pp. 10, 17-19. (Added Ref Nov. 5, 2009).

Incremental tensor analysis: theory and applications, Jimeng Sun, Dacheng Tao, Spiros Papadimitriou, Philip Yu, Christos Faloutsos, ACM, Oct. 2008, pp. 1-37.

PCT/US2007/09/45725; International Search Report_WO; Jul. 15, 2009.

PCT/US2006/004257 European Search Report Oct. 23, 2009.

IEEE, no matched results, Nov. 11, 2009, 1 page.

John Thompson, "A Graphic Representation of Interaction With the NEXIS News Database," MIT Thesis (May 1983).

Lippman, et al., "News and Movies in the 50 Megabit Living Room," IEEE/IEICE, Global Telecommunications Conference, pp. 1976-1981 (Nov. 15, 1987).

Bender, et al., "Newspace: Mass Media and Personal Computing," Proceedings of USENIX, Conference, pp. 329-348 (Summer 1991).

Lie, "The Electronic Broadsheet—All the News That Fits the Display," MIT Master's Thesis, pp. 1-96 (Jun. 1991).

Jonathan L. Orwant, "Doppelgänger: A User Modeling System," MIT Bachelor's Thesis (Jun. 1991).

"Lessons from LyricTimeTM: A Prototype Multimedia System" 4th IEEE ComSoc International Workshop on Multimedia Communications (Apr. 1992).

Belkins, et al., "Information Filtering and Information Retrieval: Two Sides of the Same Coin?", Communications of the ACM (Dec. 1992).

Architecting Personalized Delivery of Multimedia Information,: Communications of the ACM (Dec. 1992).

Jonathan L. Orwant, "Doppelgänger Goes to School: Machine Learning for User Modeling," MIT Master of Science Thesis (Sep. 1993).

Jon Orwant, "Appraising the User of User Models: Doppelgänger's Interface," in: A. Kobsa and D. Litman (eds.), Proceeding of the 4th International Conference on User Modeling (1994).

Bender, "Twenty Years of Personalization: All about the Daily Me," Educause Review (Sep./Oct. 2002).

PCT/ES2005/00003 Written Opinion of the International Searching Authority Report dated Jun. 10, 2005.

PCT/ES2005/000213 Written Opinion of the International Searching Authority dated Jan. 12, 2006.

PCT/ES2005/00003 Written Opinion of the International Preliminary Examining Authority dated Mar. 19, 2007.
PCT/ES2005/00003 International Preliminary Report on Patentability (Ch II) Report dated May 22, 2007.
PCT/ES2005/000213 International Preliminary Report on Patentability (Ch II) Report Dated Nov. 15, 2007.
ShopSmart: Product Recommendations through Technical Specifications and User Reviews; Alexander Yates et al. Temple University; CIKM; Oct. 26-30, 2008, Napa Valley, CA, USA; 2 pages.
Delivering Interactive Multimedia Documents over Networks; Shoshana Loeb; IEEE Communications Magazine; May 1992; 8 pages.
"Communications of the ACM" Dec. 1992, vol. 35, No. 12 at pp. 26-28 (Introduction to special issue regarding Workshop on High Performance Information Filtering, Morristown, N.J. Nov. 1991).

Strands Business Solutions. "Integration Document v.2.0"; Published May 2008; [online retrieved on Jan. 21, 2010] Retrieved from the internet <URL: http://recommender.strands.com/doc/SBS-Integration-Document.pdf>; entire document—18 pages.
PCT/US09/68604 International Search Report and Written Opinion of the International Searching Authority; dated Feb. 17, 2010.
Extended European Search Report and Search Report Opinion dated Aug. 5, 2010 for PCT/US2006/003795.
Tom Bunzel, "Easy Digital Music," QUE Publisher, Aug. 18, 2004, Chapters 5 and 8.

* cited by examiner

SYSTEMS AND METHODS FOR PROMOTIONAL MEDIA ITEM SELECTION AND PROMOTIONAL PROGRAM UNIT GENERATION

RELATED APPLICATIONS

This application claims the benefit under 35 U.S.C. §119 (e) of U.S. Provisional Patent Application No. 60/722,750 filed Sep. 30, 2005, and titled "SYSTEM AND METHOD FOR DYNAMICALLY IDENTIFYING A SET OF MEDIA ITEMS RESPONSIVE TO AN INPUT SET OF MEDIA ITEMS BY USING METRICS AMONG MEDIA ITEMS." This application also claims the benefit under 35 U.S.C. §119 (e) of U.S. Provisional Patent Application No. 60/730,599 filed Oct. 26, 2005, and titled "SYSTEM AND METHOD FOR PROVIDING INDIVIDUALLY CUSTOMIZED MEDIASET INCORPORATING INDIVIDUALLY CUSTOMIZED PROMOTIONAL MEDIASET." Both of the foregoing applications are incorporated herein by specific reference.

BRIEF DESCRIPTION OF THE DRAWINGS

Understanding that drawings depict only certain preferred embodiments of the invention and are therefore not to be considered limiting of its scope, the preferred embodiments will be described and explained with additional specificity and detail through the use of the accompanying drawings in which.

DETAILED DESCRIPTION OF PREFERRED EMBODIMENTS

Figure 1:
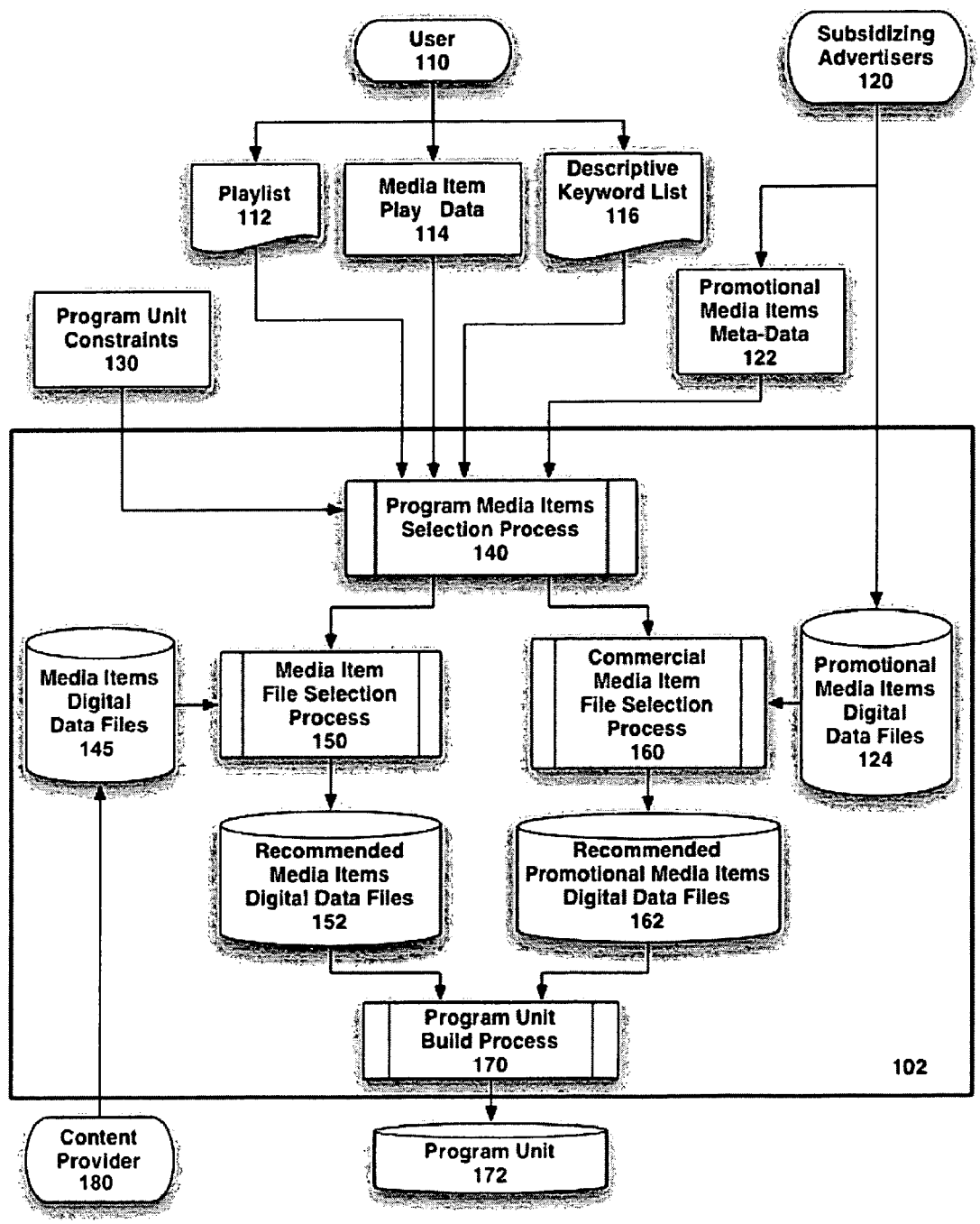
FIG. 1 is a block diagram of an illustrative process for building a program unit responsive to user taste data.

In the following description, certain specific details of programming, software modules, user selections, network transactions, database queries, database structures, etc., are provided for a thorough understanding of the specific preferred embodiments of the invention. However, those skilled in the art will recognize that embodiments can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. In some embodiments, the methodologies and systems described herein may be carried out using one or more digital processors, such as the types of microprocessors that are commonly found in PC's, laptops, PDA's and all manner of other desktop or portable electronic appliances.

Disclosed are embodiments of systems and methods for selection of promotional media items and/or generation of advertising units. In some embodiments, a system for constructing a program unit composed of one or more media items and one or more promotional media items is provided. The media items may be selected to be responsive to a particular user's, or group of users', tastes. The promotional media items may also be selected to be responsive to the media items in the program unit and the user's/users' tastes so that they are of greater interest to the user(s) than a random selection of promotional media items. The media items and promotional media items may also be selected to meet additional constraints, such as the number, licensing costs, and revenue generated by the program unit, as well as other statutory or contractual compositional constraints. Some embodiments may provide for systems and methods for constructing program units which also are responsive to the tastes of a user, some of which can generate advertising revenues which offset the licensing costs of the media items.

In some embodiments, a media recommender subsystem and a promotional media recommender subsystem are provided. The media recommender subsystem may generate media items, and the promotional media recommender subsystem may generate promotional media items, responsive to one or more user taste preferences. A means for using these recommenders to generate a set of media items and set of promotional media items which satisfy certain constraints may also be provided. The selected items may then be combined into a single program unit, such as a promotional program unit.

As used herein, the term "media data item" is intended to encompass any media item or representation of a media item. A "media item" is intended to encompass any type of media file which can be represented in a digital media format, such as a song, movie, picture, e-book, newspaper, segment of a TV/radio program, game, etc. Thus, it is intended that the term "media data item" encompass, for example, playable media item files (e.g., an MP3 file), as well as metadata that identifies a playable media file (e.g., metadata that identifies an MP3 file). It should therefore be apparent that in any embodiment providing a process, step, or system using "media items," that process, step, or system may instead use a representation of a media item (such as metadata), and vice versa.

Likewise, the term "promotional media data item" is intended to encompass any promotional media item or representation of a promotional media item. A promotional media item is a media item which promotes, publicizes, advertises, advances, etc., something other than the promotional media item itself. A promotional media item can be of different types, e.g., a commercial advertisement, public service announcement, editorial, political endorsement, etc. Again, in any embodiment providing a process, step, or system using "promotional media items," that process, step, or system may instead use a representation of a promotional media item (such as metadata), and vice versa.

A "play" of a media item is a presentation of the digital data for the media item to the user in a form such that the user can perceive the expressive content of the media item. A "playlist" is a list of media items grouped by the user as a composition. A media item recommender is a system or method for generating a list of media items which are responsive to another input list of media items. A promotional media item recommender is a system or method for generating a list of promotional media items which are responsive to another input list of media items. Examples of recommender systems that may be used in connection with the embodiments set forth herein are described in U.S. patent application Ser. No. 11/346,818 titled "Recommender System for Identifying a New Set of Media Items Responsive to an Input Set of Media Items and Knowledge Base Metrics," now U.S. Pat. No. 7,734,569, which is incorporated herein by reference in its entirety.

As used herein, a "program unit" is an integral item comprised of one or more media items and one or more promotional media items. A webcast is the transmission of digital media items from a computer server system over the Internet to a plurality of user computers incorporating digital media players that make the expressive content of the media items perceptible to the user. A podcast is the transmission of digital media items from a computer server system over the Internet to a plurality of user computers incorporating means for conveying the digital media items to a portable digital media player that makes the expressive content perceptible to the user.

A program unit may be a composition that, for certain types of media items (e.g., sound recordings) integrated therein, is protected under copyright laws from being decomposed into individual component media items that could be conveyed to others. In addition, for many types of media items and digital encoding formats, once the media items and promotional media items have been encoded into a single file of digital data, an encoding format may be used that makes it technically infeasible for a user lacking expert technical skills to decompose the integral program unit back into component items. Therefore, the license holders for the media items may be protected from lost royalties due to illegal conveyance of individual media items.

As used herein, a "mediaset" is a list of media items that, for example, an advertiser has grouped together. A promotional mediaset is therefore a list of promotional media items that have been grouped together.

As used herein, a "metric" M between a media item i and a promotional media item j, or between a media item i and a media item j, for a given knowledge base K, expresses the strength of association between i and j with respect to K. A metric may be expressed as a distance, where smaller distance values represent stronger association values, or, alternatively, as a similarity, where larger similarity values represent stronger association values.

A matrix representation for metric M for a given knowledge base K can be defined as a two-dimensional matrix where the element $M(i, j)$ is the value of the metric between the media item i and a promotional item j, or between a media item i and a media item j.

A graph representation for a given knowledge base K, is a graph where nodes represent media items and/or promotional media items, and edges are between pairs of media items or between media items and promotional media items. Pairs of media items i, j may be linked by labeled directed edges, where the label indicates the value of the similarity or distance metric $M(i,j)$ for the edge with head media item i and tail media item j. Media items and promotional media items may alternatively be linked by labeled undirected edges, where the label indicates the value of the similarity or distance metric $M(i,j)$ for the edge with head media item i and tail promotional media item j.

One specific embodiment is shown in and described with reference to FIG. 1. A user 110 provides information about his or her personal tastes in media items to the system 102. These tastes may be provided, for example, in the form of one or more media item playlists 112 via a computer and software program, a portable digital media player that is a standalone device, or a communications device, such as a telephone, with embedded digital media player technology. User taste data may also be provided as a list of media items 114 recently played by the user on a digital media player of any type. User taste data may also be provided as a list of descriptive keywords 116 that specify the type and/or characteristics of media items of interest to the user.

Advertisers 120 may provide promotional media items to the system 102 in the form of, for example, digital data files 124. Advertisers may also supply metadata 122 with the promotional media items 124 to the program media items selection process 140 to associate individual promotional media items with media items. Examples of metadata 122 include descriptive keywords about a promotional media item, specific target demographics for a promotional media item, identifiers for media items embedded in the promotional media item, and/or an explicit list of media items with which the advertiser wishes to associate a promotional media item, one or more of which may be used by a promotional media item recommender to provide promotional media items responsive to the media items supplied to it.

One or more program unit constraints 130 may also be used to narrow the pool of media data items and/or promotional media data items from which items are selected for the program unit. One such constraint may limit the number of media data items associated with a particular artist. Other constraints may limit the licensing costs associated with the media data items. Still other constraints may be configured to ensure that the media data items and the promotional media data items selected for a promotional program unit are selected such that advertising revenues associated with the promotional media data items are at least equal to licensing costs associated with the media data items.

Figure 2:
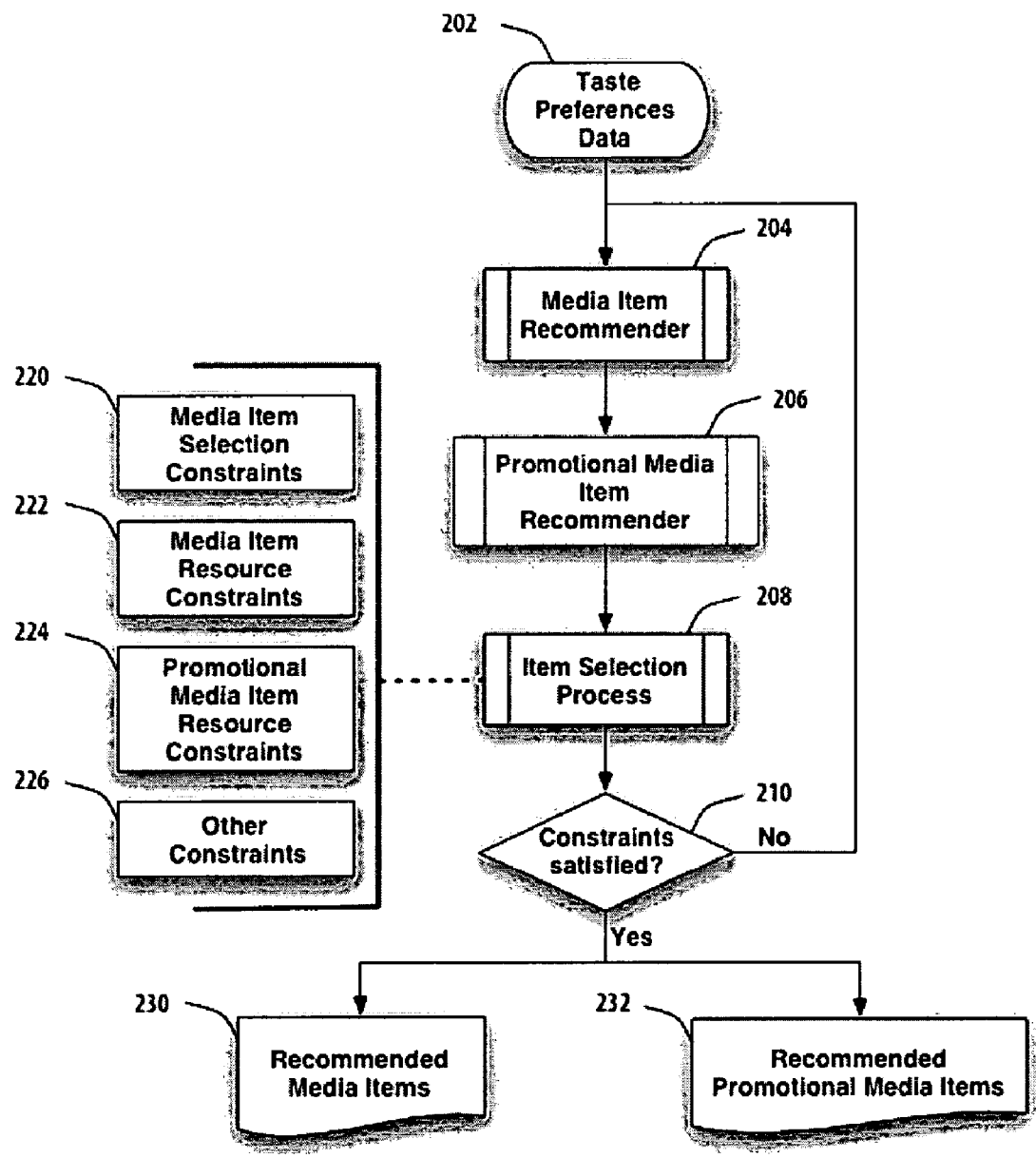
FIG. 2 is a flowchart of an illustrative process for selecting media items and promotional media items for a program unit.

The program media selection process 140, described further below, may ultimately produce a list of recommended media items 230 and a list of recommended promotional media items 232, as shown in FIG. 2. The recommended media items 230 and recommended promotional media items 232 may be selected to satisfy the program unit constraints 130, and may also be responsive to the user-supplied taste data 112, 114, and/or 116.

The media item file selection process 150 may use the list of recommended media items 230 to select digital data files 152 for the recommended media items from the collection of media item digital data files 145. Digital data file collection 145 may be provided by a content provider 180. Similarly, the promotional media item selection process 160 may use the list of recommended media items 232 to select digital data files 162 for the recommended promotional media items from the collection of promotional media item digital data files 124.

The digital data files 152 for the recommended media items 230 and digital data files 162 for the recommended promotional media items 232 may then be combined by the program build process 170 into a single digital data file representing the program unit 172. The media items 230 and promotional media items 232 may be a mix of different media types with different media encoding formats (e.g., MP3, AAC, Vorbis, RealAudio, WMA, Theora, RealVideo, WMV, MPEG) and multimedia container file formats (e.g., AVI, QuickTime, Ogg, RealMedia, ASF). In one embodiment that relates to a mix of media items 230 and promotional media items 232 which can be packaged in a single multimedia container file format, the program build process 170 packs the mix of media and promotional media items into a program unit file 172 with that multimedia container file format.

In another embodiment that relates to a mix of media items 230 and promotional media items 232 which can be encoded into a single media encoding format, the build process 170 first decodes each of the media items and promotional media items with an appropriate decoder, concatenates the now unencoded items into a single file, and inserts any desired filler media items between them. The resulting items may then be encoded into a program unit file 172 with the appropriate single media encoding format.

Another aspect of the program unit build process 170 is the manner in which promotional media items are sequenced with the media items in the program unit 172. In one embodiment, the promotional media items are interleaved between groups of media items. The size of the groups may be specified by the program operator. In another embodiment, the promotional media items are inserted in the sequence of media at appropriate points defined by an "auto-DJ" program that achieves some overall compositional objective. In yet another embodiment, the promotional media items may be grouped before, after, or both before and after, the entire set of media items.

One illustrative implementation of the program media selection process 140 is shown in the flowchart of FIG. 2. The depicted selection process utilizes a media item recommender 204 and a promotional media item recommender 206. The media recommender system 204 produces a set of recommended media items 230 responsive to the user taste data 202 (112, 114, and/or 116 in FIG. 1) from the collection of media item digital data files 145 from content providers 180. Some embodiments can incorporate a media item recommender which accepts one or more of the constraints 220, 222, 224, and 226 provided to the selection process 208 to further constrain the set of recommended media items to those that are of most utility in the rest of the selection process. Other embodiments can incorporate a media item recommender which, to the extent possible, supplies a requested number of media items estimated from constraints 220, 222, 224, and 226.

The promotional media item recommender system 206 likewise produces a set of recommended promotional media items 232 responsive to the user taste data 202 and/or the list of media items produced by the media item recommender 204.

Various embodiments can incorporate different methods for generating sets of recommended media items 230 and recommended promotional media items 232 that satisfy one or more constraints, such as constraints 220, 222, 224, and 226. One embodiment implements a simple "greedy" algorithm as follows. The media item recommender 204 is used to generate a preliminary set of media items responsive to the user taste data 202. The promotional media item recommender 206 is then used to generate a preliminary set of promotional media items responsive to the user taste data 202 and the preliminary set of media items. The preliminary set of media items and the preliminary set of promotional media items are supplied to the item selection process 208, along with the item constraints 220, 222, 224, and 226. These constraints may be used to select a final list of media items and promotional media items that satisfy the constraints.

If the constraints are not satisfied, as exemplified by the test 210, the process extends the preliminary set of recommended media items and promotional media items with additional recommendations from the recommenders 204 and 206. This process of extending the list of recommended media items and promotional media items, selecting subsets that satisfy the constraints, and testing if the constraints are satisfied, repeats until a final set of recommended media items 230 and a final set of recommended promotional media items 232 are generated. Alternatively, these steps may be repeated until an arbitrary termination criteria, such as reaching a predetermined number of attempts, is met to avoid infinite repetition of the process.

The item selection process 208 is understood to embody any process for selecting an optimal subset of items from an input set of items, subject to a set of constraints on the properties of the items. One such class of constraints that may be imposed on the items in the final program unit is made up of resource constraints 222 and 224. These constraints can be generally formulated as an integer-programming problem, as follows. Given a set of media items $m_1, m_2, \ldots, m_k$ with play times $t_1, t_2, \ldots, t_k$ that engender licensing costs $c_1, c_2, \ldots, c_k$, and a set of promotional media items $p_1, p_2, \ldots, p_l$ with play times $s_1, s_2, \ldots, s_l$ that generate revenues $r_1, r_2, \ldots, r_l$, select a subset $M$ of media items and a subset $P$ of promotional media items that satisfy the inequalities $$|M| \geq K', \sum_{m_i \in M} t_i \geq T;$$

$$|P| \leq L', \sum_{p_i \in P} s_i \leq S;$$

$$\sum_{m_i \in M} c_i - \sum_{p_i \in P} r_i \leq C$$

These inequalities specify that the program unit will include a minimum of $K'$ media items having a minimum total play length of $T$ time units, a maximum of $L'$ promotional media items having a total play length of $S$ time units, and will have a net cost to produce of $C$. Different embodiments of the invention implementing specific instances of one or more of these general constraints are also contemplated.

For instance, some embodiments may produce program units the licensing costs of which (stemming from use of the incorporated media items) are completely subsidized by advertising revenues (stemming from use of the incorporated promotional media items). Such embodiments may implement the equivalent of setting C=0. Other embodiments, which may be useful for applications in which users will pay a premium for program units not having promotional media items, may implement the equivalent of setting L'=S=0. Some such embodiments may be implemented so as to have a specified maximum cost. A variant of this, in which cost is not a factor to the user, may implement the equivalent of setting C=∞. Another embodiment that places no limits on the number of promotional media items in the program unit, such that advertising revenues offset the licensing costs of the media items to the maximum extent possible, may implement the equivalent of setting L'=S=∞. Yet another embodiment may be structured with the goal of having the cost of the program unit (from the media items) be completely subsidized by advertising revenues (from the promotional media items). Such an embodiment may implement the equivalent of setting M'=T=0 and C=0.

Embodiments which implement other constraints in the numbers, play times, licensing costs, and generated revenues of the media items and promotional media items incorporated into the program unit are also contemplated, as would be apparent to one of ordinary skill in the art.

Another class of constraints that may be imposed on the program unit in some embodiments are compositional constraints 226 on the set of media items. As one example, in applications including media items that are sound recordings, these compositional constraints may limit the number of media items by the same author or from the same collection of media items pursuant to the "sound recording content selection" conditions included in the statutory license provisions of 17 U.S.C. §114, also known as the Digital Millennium Copyright Act (DMCA). Under these provisions, during any three-hour time period, a transmission may not include more than:

1) Three sound recordings from a particular album, or two sound recordings from the same album consecutively;

2) Four sound recordings by a particular artist, or from a set or compilation of albums; or 3) Three sound recordings by a particular artist consecutively, or from a set or compilation of albums consecutively.

In one implementation of the program media items selection process 140, constraints, such as a list of artists and/or albums, and/or the allowable number of sound recordings by each artist or from each album in the program unit, may be employed. In such implementations, the selection process 140 may operate so as to ensure that the number of selections by each of the listed artists and albums does not exceed a specified number.

Embodiments which supply a sequence of program units to a customer must only ensure that the sequence of program units does not violate the DMCA content-selection criteria in any three-hour period. Such embodiments may therefore constrain the build process 170 so as not to begin a program unit with a media item that would violate the DMCA restrictions when juxtaposed with the media item that ends the previous program unit. Of course, other constraints on the properties of items for specifying an optimal subset of items from a set are contemplated, many of which would be apparent to those of ordinary skill in the art. For example, "greedy" procedures and other heuristics for selecting an optimal subset of items from an input set of items subject to a set of constraints on the properties of the items are well understood to those of ordinary skill in the art.

One of ordinary skill in the art will also understand that, while the above system and methods are described as embodied in a promotional media recommendation system, the inventive system could be used in any system for recommending items that can be associated with a second type of item in a meaningful way to a user.

Other embodiments disclosed herein relate to systems and methods for recommending items to a user in a personalized manner. Some such embodiments relate to recommender systems containing promotional media items which can be associated with an input set of media items.

For example, in some embodiments, a system for identifying a set of promotional media items in response to an input set of media items is provided. The system may use a knowledge base which can include, for example, a set of promotional media items, a collection of mediasets, and specified associations between promotional media items and mediasets. In such embodiments, each promotional media item in the set may be associated with a mediaset in the collection of mediasets. Other systems may use a knowledge base that includes a set of media items, a collection of promotional mediasets, and specified associations between media items and promotional mediasets. A variety of metrics between media items and promotional media items may be considered by, for example, analyzing how the promotional mediasets are associated with the media items or by analyzing how the mediasets are associated with the media items. Such metrics may be stored in a matrix that allows the system to identify promotional media items that compliment an input set of media items. In some embodiments, the metrics may specify not only whether, but also the degree to which, a promotional media item is associated with a media item. The associations between promotional media items and mediasets, or media items and promotional mediasets, may be either explicitly or implicitly specified.

Metrics of the knowledge base of the system may be used to correlate an input set of media items with a preferred set of promotional media items. In some embodiments, different metrics between media items and promotional media items can be built from advertiser-supplied preferences for associating promotional media items and media items, including, but not limited to, metrics which associate:

1) a promotional media item with media items that are embedded in the promotional media item and with other media items that share a characteristic of the embedded media item, such artist, actor, etc.;

2) a promotional media item with media items that the advertiser explicitly specifies;

3) a promotional media item with media items known to be preferred by a particular audience/user, an audience/user specified by the advertiser, and/or an audience/user with certain characteristics; or 4) a promotional media item identified by specific keywords with media items identified by the same keywords.

Such metrics can be represented in an explicit form that directly associates media items with promotional media items. Alternatively, such metrics can be represented in an implicit form that associates media items with media items such that a promotional media item can be associated with a media item via a sequence of intermediate media items and the value of the metric for the promotional media item and the media item is a defined function of the metric for successive pairs of the intermediate media items.

Figure 3A:
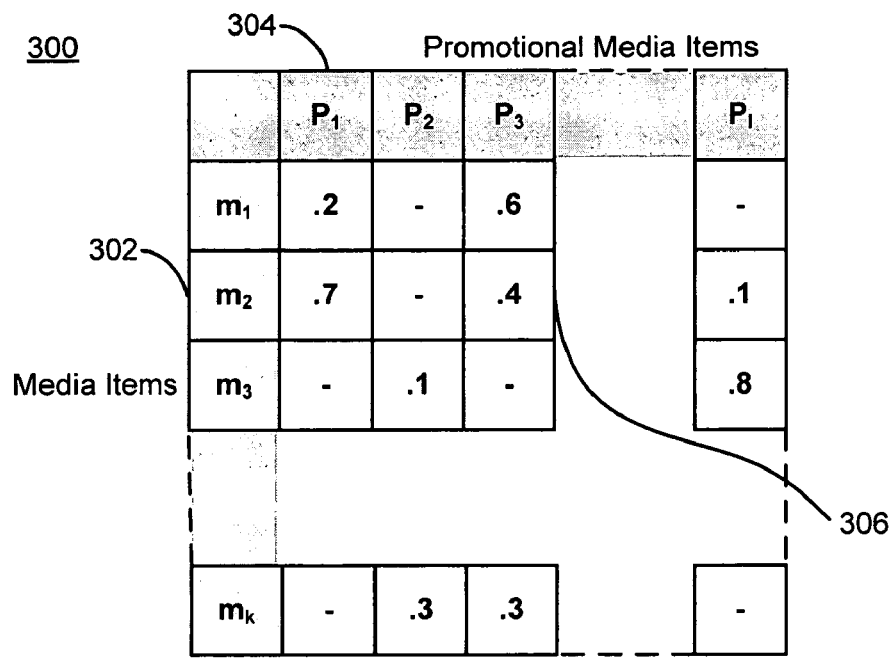
FIG. 3A is a representation in matrix form of a metric describing the similarity values between a collection of media items and a collection of promotional media items.
Figure 3B:
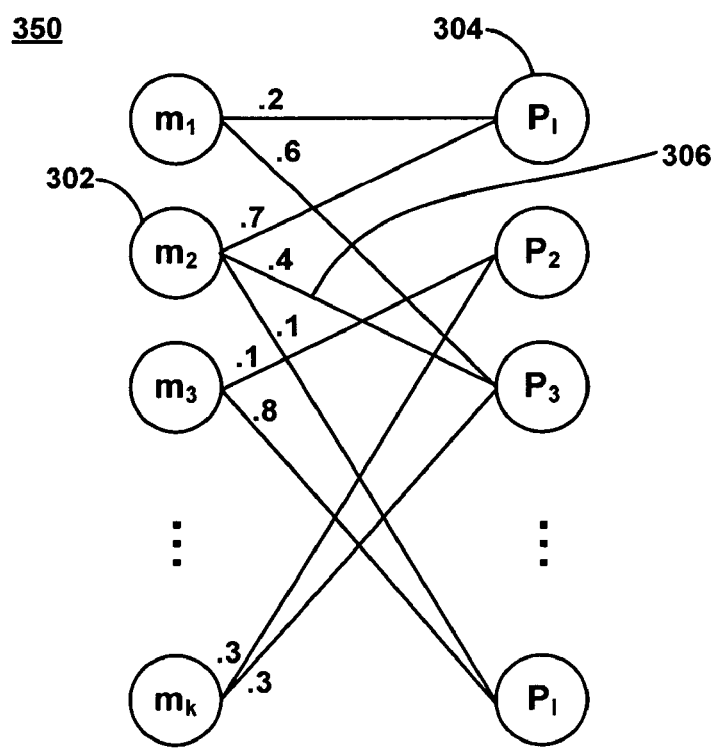
FIG. 3B provides a weighted, undirected graph representation for the associations between a collection of media items and a collection of promotional media items. Each edge between a media item and a promotional media item is annotated with a weight representing the similarity value between the media item and the promotional media item.
Figures 5, 6:
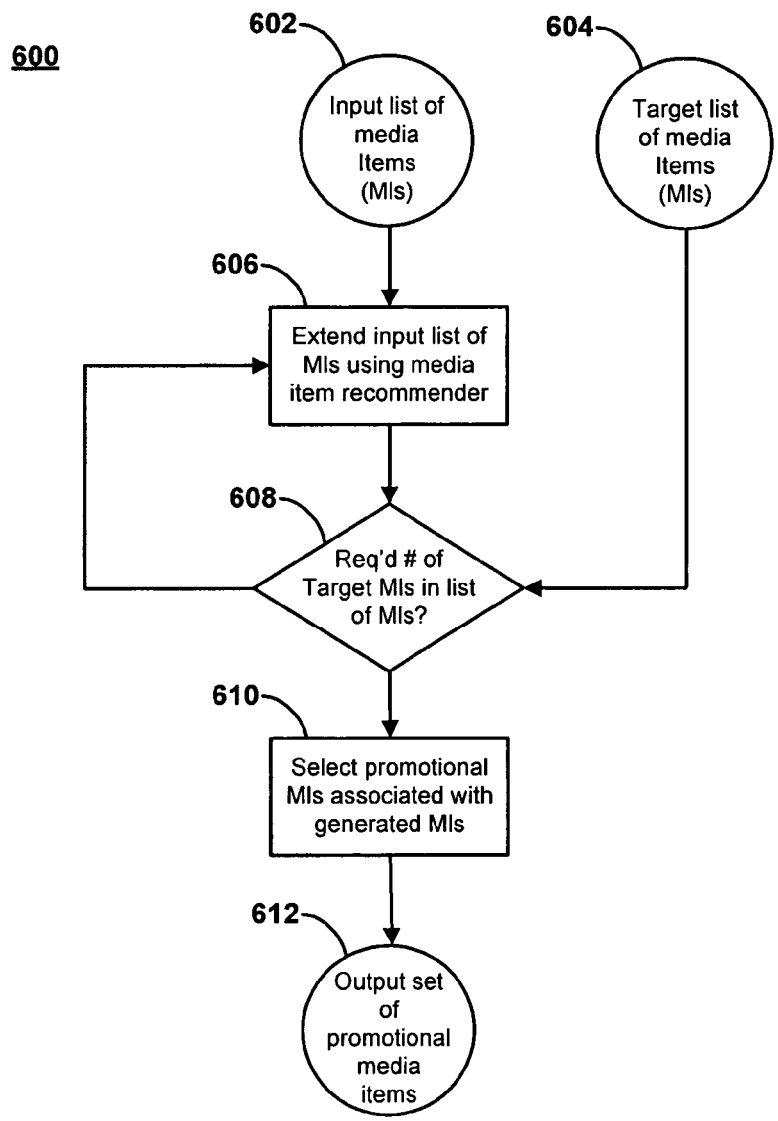
FIG. 5 is a flowchart of an illustrative method for generating an output set of promotional media items from an input set of media items.
FIG. 6 is a block diagram of an illustrative method for selecting a set of promotional media items corresponding to an input set of media items.

One implementation of a method is shown in FIG. 5. The method accepts an input set 501 of media items. A first collection of candidate promotional media items most similar in some respect to the input media items is generated by process 502, based on the metric matrix 300 of FIG. 3A (or the diagram 350 of FIG. 3B). For each media item 302 in the input set 501, process 502 could, for example, add every promotional media item 304 with a non-zero similarity value in the row of metric matrix 300 for the particular media item to the candidate collection of promotional media items. Each promotional media item may then be labeled with its corresponding metric value. To further illustrate, media item m2 is related to promotional media item p3 with similarity value 0.4, as indicated at 306 in FIGS. 3A and 3B.

From this first collection of candidate promotional media items, a second subset of candidate promotional media items is then selected by process 503. As an example, process 503 could order the promotional media items in the first collection in decreasing order according to their respective metric value. The first N unique promotional media items may then be selected as the subset.

Finally, from the subset of promotional media items, a third and final output set 505 of some specified number of promotional media items may be selected. This final output set may be selected so as to satisfy additional desired external constraints by process 504. For instance, in some applications the system may be used to provide promotional media items responsive to input sets of media items where a number of characteristics, such as age, location, etc., are known about the person supplying the input set of media items.

An advertiser that supplied a particular promotional media item may specify that the promotional media item only be provided to persons with certain characteristics, such those of an age within a specified range. If the second collection of promotional media items input to process 504 includes such a promotional media item, process 504 would then add or withhold this promotional media item from the final output set of promotional media items 505, as determined by whether or not the person to whom the promotional media items will be supplied has the characteristic, such as being in the target age group, specified by the advertiser. As another example, process 504 could withhold promotional media items that have been previously supplied to the person associated with the input media set within some designated period of time (or ever) from the output set of promotional media items 505. Any number of other such characteristics for filtering the promotional media items and methods for doing so will be apparent to a person of ordinary skill in the art.

Figure 4A:
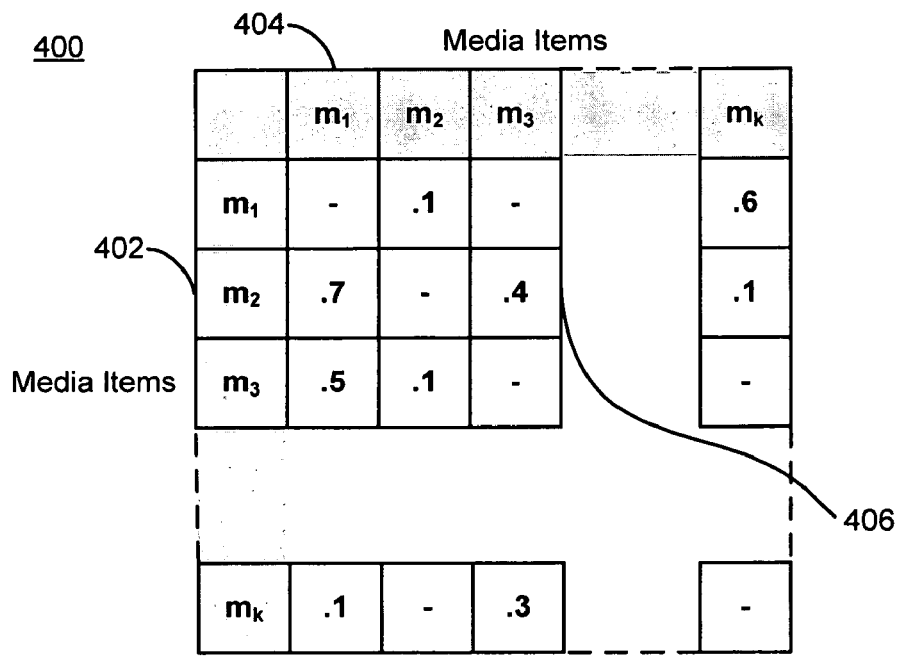
FIG. 4A is a representation in matrix form of a metric describing the similarity values between media items from which a metric relating a collection of media items and a collection of promotional media items may be derived.
Figure 4B:
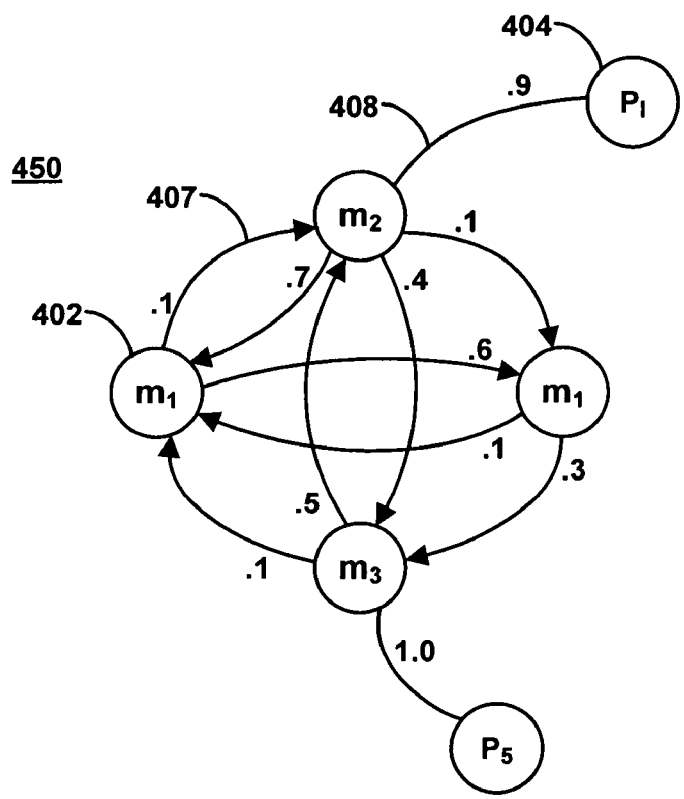
FIG. 4B provides a weighted, directed graph representation for the associations between a collection of media items and a collection of promotional media items. Each directed edge between a pair of media items is annotated with a weight representing the similarity value between the media item at the head of the edge and the media item at the tail of the edge. Each undirected edge between a media item and a promotional media item is annotated with a weight representing the similarity value between the media item and the promotional media item.

In other embodiments, explicit associations including similarity values between just a subset of the full set of media items known to the system and the set of promotional media items may be provided, as shown in the graph of FIG. 4B. A set of associations including similarity values between the media items may also provided, either as a matrix 400, as shown in FIG. 4A, or a functionally equivalent form. In the depicted embodiment, if the similarity value between a media item 402, denoted here by the index i, and promotional media item 404, denoted here by the index j, is not explicitly specified, an implicit similarity value may be derived by following a directed path. One example of such a path is represented by edges 407 and 408 from the media path from media item m1 to promotional media item p1 via media item m2. The list $M(i, i+1), M(i+1, i+2), \ldots, M(i+k, j)$ of similarity values 406 between pairs of media items 402, 404 with the edges on the path labeled may be combined in a manner such that the resulting value satisfies a definition of similarity between media item i and promotional media item j, as appropriate for the application. For example, the similarity $M(i,j)$ might be computed as follows:

$$M(i,j) = \min\{M(i,i+1), M(i,i+2), \ldots, M(i+k,j)\}$$

or $$M(i,j) = M(i,i+1) * M(i,i+2) * \ldots * M(i+k,j)$$

Other methods for computing the similarity value $M(i,j)$ for the path between media item i and promotional media item j, where the edges are labeled with the sequence of similarity values $M(i, i+1), M(i+1, i+2), \ldots, M(i+k, j)$, will be apparent to a person of ordinary skill in the art.

In yet another embodiment corresponding to the graph in FIG. 4B, the similarity metric for pairs of media items represented in FIG. 4A may not be explicitly represented in the form of a matrix but may instead be implicitly embodied by an iterative process, such as process 600 of FIG. 6, that accepts the input set of media items 602 and a second target set 604 of one or more media items explicitly specified to be associated with certain promotional media items. Process 600 may use a media recommender, as indicated at step 606, to iteratively generate a growing list of media items similar to the input media items 602. Exemplary media recommenders that may be used in connection with various embodiments discussed herein are disclosed in U.S. patent application Ser. No. 11/346,818 titled "Recommender System for Identifying a New Set of Media Items Responsive to an Input Set of Media Items and Knowledge Base Metrics," previously incorporated by reference.

The growing list of media items may be compared at step 608 to the target media items 604 and the process of expanding the list may be terminated when it contains the required number of target media items. The promotional media items associated with the target media items in the list of recommended media items may be selected at 610. These promotional media items may then be used as the collection of promotional media items 612 output by process 600 to serve as the first collection of promotional media items used by the process shown in FIG. 5.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. Therefore, it is to be understood that the invention is not to be limited to the specific embodiments disclosed and that modifications and other embodiments are intended to be included within the scope of the appended claims. For example, one of ordinary skill in the art will understand that, while several of the above systems and methods are described as embodied in a promotional media recommendation system, it should be understood that the inventive system could be used in any system for recommending items that can be associated with a second type of item in a meaningful way to a user.

The scope of the present invention should, therefore, be determined only by the following claims.

The invention claimed is:

1. A computer implemented method for generating a promotional program unit, the method comprising:
   receiving user taste data for a user;
   wherein the user taste data comprises a playlist that reflects a list of media items grouped together by the user as a composition or a list of media items recently played by the user;
   applying a media item recommender process to the received user playlist to generate a preliminary set of recommended media items responsive to the user playlist;

receiving promotional media data items from an advertiser;

associating at least one promotional media data item with at least one of the preliminary set of recommended media items;

wherein the associating step is responsive to a knowledge base of similarity metrics that reflect a level of association between each of the preliminary set of recommended media data items and the set of promotional media items; and the metrics are derived from advertiser-supplied preferences comprising a list of at least one media item selected by the advertiser for association with a corresponding promotional media item;

combining at least one promotional media data item and the associated recommended media item into a promotional program unit;

testing the promotional program unit for compliance with a predetermined overall compositional constraint;

if the promotional program unit does not satisfy the overall constraint, applying the media item recommender process again so as to extend the preliminary set of recommended media items to an expanded set; and then repeating said associating, combining, and testing steps using the expanded set of recommended media items.

2. The method of claim 1 wherein the user taste data comprises a list of keywords; and the media item recommender process is applied to the list of keywords to generate the preliminary set of recommended media items.

3. A computer implemented method for identifying a set of promotional media data items for use in building a customized promotional program unit, the method comprising:

receiving as input a playlist of media data items associated with an individual user, wherein the playlist reflects a list of media items grouped together by the user as a composition or a list of media items recently played by the user;

applying a media item recommender process to the input playlist to expand the playlist to form a preliminary set of recommended media items responsive to the input playlist;

receiving a set of promotional media items;

comparing the preliminary set of recommended media data items to the set of promotional media items by accessing a knowledge base, wherein the knowledge base includes metrics that reflect a level of association between each of the preliminary set of recommended media data items and the set of promotional media items and wherein the metrics are derived from advertiser-supplied preferences comprising a list of at least one media item selected by the advertiser for association with a corresponding promotional media item;

selecting a subset of the promotional media data items based upon the media data item comparison;

combining at least one of the preliminary set of recommended media data items together with at least one of the selected subset of the promotional media data items to form a customized promotional program unit; and storing the promotional program unit into a memory for electronic transmission over a network to the said individual user.

4. The method of claim 3, wherein the comparing step comprises generating an implicit metric value between a first media data item and a promotional media item by using a first explicit metric value of the knowledge base that associates the first media item and a second media item, and further using a second explicit metric value of the knowledge base that associates the second media item with the promotional media item.

5. The method of claim 3, wherein the comparing step comprises:

receiving a target set of media data items, wherein the target set comprises at least one media data item explicitly specified by an advertiser to be associated with at least one target promotional media data item; and generating the recommended set of media data items by feeding the target set of media data items into the media item recommender.

6. The method of claim 3, wherein the media data items comprise playable media files.

7. The method of claim 3, wherein the promotional media data items comprise commercial advertisements.

8. The method of claim 3, wherein the media data items comprise metadata that identifies a playable media file.

9. A computer implemented method for identifying a set of promotional media data items for use in connection with one or more media data items, the method comprising:

receiving an input set of media data items from a user;

receiving an indication of an audience preference from an advertiser;

comparing the media data items in the input set to a set of promotional media data items in a knowledge base by use of metrics relating the media data items in the input set to the set of promotional media data items; wherein the metrics are derived from advertiser-supplied preferences comprising a list of at least one media item selected by the advertiser for association with a corresponding promotional media item;

generating a set of candidate promotional media data items, wherein the candidate promotional media data items are selected from the set of promotional media data items, and wherein the metric is used to select the set of candidate promotional media data items;

generating a subset of promotional media data items, wherein the subset of promotional media data items are selected from the set of candidate promotional media data items, and wherein the audience preference is used to select the subset of promotional media data items; and storing the subset of promotional media data items into a memory for electronic transmission over a network to the audience of users.

10. A method according to claim 3 wherein the list of at least one media item selected by the advertiser for association with a corresponding promotional media item includes media items that are embedded in the promotional media item.

11. A method according to claim 3 wherein the knowledge base includes metrics between media items and promotional media items responsive to advertiser-supplied preferences, wherein the metrics associate a promotional media item with media items-known to be preferred by a particular audience or user.

12. A method according to claim 3 wherein the knowledge base includes metrics between media items and promotional media items responsive to advertiser-supplied preferences, wherein the metrics associate a promotional media item with media items known to be preferred by an audience or user specified by the advertiser.

* * * * *